(12) United States Patent
Wang et al.

(10) Patent No.: US 8,702,914 B2
(45) Date of Patent: Apr. 22, 2014

(54) OXYGEN GENERATOR

(75) Inventors: Sea-Fue Wang, Taipei (TW); Anthony Lee, Taipei (TW)

(73) Assignee: National Taipei University of Technology, Taipei (TW)

( * ) Notice: Subject to any disclaimer, the term of this patent is extended or adjusted under 35 U.S.C. 154(b) by 331 days.

(21) Appl. No.: 13/177,646

(22) Filed: Jul. 7, 2011

(65) Prior Publication Data

US 2012/0097531 A1    Apr. 26, 2012

(30) Foreign Application Priority Data

Oct. 22, 2010   (TW) .............................. 99136251 A

(51) Int. Cl.
*C25B 9/00* (2006.01)
*C25B 9/18* (2006.01)
*C25B 1/02* (2006.01)

(52) U.S. Cl.
USPC ............ 204/258; 204/193; 204/194; 204/242

(58) Field of Classification Search
CPC ................ C25B 9/00; C25B 9/18; C25B 1/02
USPC ...................... 204/242, 258, 193, 194, 157.51
See application file for complete search history.

(56) References Cited

U.S. PATENT DOCUMENTS

| | | | | | |
|---|---|---|---|---|---|
| 4,877,506 | A | * | 10/1989 | Fee et al. ...................... | 204/242 |
| 5,034,023 | A | * | 7/1991 | Thompson .................... | 205/634 |
| 5,205,990 | A | * | 4/1993 | Lawless ........................ | 422/121 |
| 5,750,279 | A | * | 5/1998 | Carolan et al. ................ | 429/456 |
| 5,961,929 | A | * | 10/1999 | Lawless ........................ | 422/121 |
| 5,972,182 | A | * | 10/1999 | Lawless ........................ | 204/258 |
| 6,025,084 | A | * | 2/2000 | Kawasaki et al. ............. | 429/456 |
| 7,285,153 | B2 | * | 10/2007 | Bruun et al. ...................... | 95/43 |
| 2002/0046947 | A1 | * | 4/2002 | Lawless ........................ | 204/426 |
| 2011/0048962 | A1 | * | 3/2011 | Reece et al. .................. | 205/633 |

* cited by examiner

*Primary Examiner* — Harry D Wilkins, III
*Assistant Examiner* — Zulmariam Mendez
(74) *Attorney, Agent, or Firm* — McClure, Qualey & Rodack, LLP

(57) ABSTRACT

An oxygen generator having a honeycomb body composed of an oxygen ion conducting material is disclosed. The honeycomb body includes one or more air channels, each of which is composed of a plurality of the first channels and the first connecting holes therebetween to form a tortuous air flow path for lengthening the detention time of air, and oxygen collection channels, each of which is composed of a plurality of the second channels and the second connecting holes therebetween for oxygen passage. The first and second channels, which extend laterally through across the body and parallel to each other, are all sealed with glass members at both the front face and back face of the body. The source gas is provided and exhausted from one side face of the body to the other side face via a plurality of air inlets and air outlets, respectively, which laterally intersect the first channels. A power source are with a negative terminal and positive terminal, respectively, connected to the air channels and oxygen collection channels, respectively, to force oxygen ion flow across the oxygen ion conducting material such that gas in oxygen collection channels will become riches in oxygen than in air channels. The oxygen within the oxygen collection channels is collected from the side face of the body through a plurality of oxygen outlets which laterally connect with the second channels.

13 Claims, 4 Drawing Sheets

OXYGEN GENERATOR

FIELD OF THE INVENTION

The present invention pertains to an oxygen generator, particularly to an oxygen generator having honeycomb structure body.

DESCRIPTION OF THE PRIOR ART

Currently on the market of the well-known type of the oxygen sensor may be of a potential type, which is made of yttrium partially stabilized zirconium (PSZ) as a solid electrolyte for oxygen ion to conduct therein. While two gases contain with different oxygen partial pressures are injected from the two ends of the foresaid oxygen sensor, zirconia or other ionic conductor, the oxygen ions will diffuse to a side having low $O_2$ concentration from the side having high $O_2$ concentration through the conductor. In the processes, oxygen molecules enter the zirconia, and then get electrons forming oxygen ions, thereafter, the oxygen ions diffuse to the other face of the ionic conductor losing electrons again and back to oxygen molecules, and then release from the ionic conductor. The diffused mechanism of oxygen ions will generate a potential difference, or called emf, across the two sides of the ionic conductor.

The principle of the oxygen sensor is based on the emf measured between the two opposite surfaces of the ionic conductor while the first gas is a reference air flow and the other is an unknown gas flow. The $O_2$ partial pressure of the unknown gases can be acquired according to the Nernst equation. The principle of the oxygen generator is exact opposite to that of the oxygen sensor. For an oxygen generator, an emf is applied to two electrodes of the oxygen generator to provide a driving force for oxygen ions diffused to the anode electrode from the cathode electrode so that the oxygen concentrations at the anode electrode side become high.

A conventional oxygen generator is disclosed by Lawless in U.S. Pat. No. 5,961,929. In FIG. 1, the oxygen generator 100 is a ceramic honeycomb structure comprising a body 102 formed of oxygen ion conductive material. A plurality of first channels 114 and a plurality of second channels 116, from a front face 118 through the body 102 to a rear face 120. Among them, the first channels 114 and the second channels 116, are, respectively, formed at alternately rows. A voltage source 122 with a negative terminal 124 and a positive terminal 126 connected in parallel respectively, to the channels 114 and 116 to form the cathode and the anode electrode of the oxygen generator 100. In addition, the right face 136 of the body 102 has third channels 137 in lateral connected the second channels 116 so that the collected oxygen gas will outflow from the third channel 137.

The oxygen generator 100 disclosed by Lawless had done something improvements as comparing with his earlier product. For example, the openings of the second channels 116 at the front face 118 and the rear face 120 has been sealed by sealed members 142 to make sure the purity of the oxygen gas therein. In addition, the improvement includes the aligned holes 154, which are provided that the third channels 137 are easier to align with the second channels 116, as is shown in FIG. 2.

In FIG. 2, it is a perspective view of a portion of the oxygen generator 100 illustrating one lateral row of the second channel 116 having the third channel formed at the longitudinal end of sidewalls of the second channels 116 in a form of the semi-circle openings 154. The locations of the semi-circle openings 154 are near the front face 118 and beneath the sealed member 142. It may remove the problem of the misalignment of the openings 154 since one can visually examine the third channel 137 prior to attach the sealed member 142 so that one can ensure the third channels do not intersect with the first channels.

Nevertheless, the air passage from the entry to the outlet for every first channel 114 is straight, which is inferior for the oxygen gas conducting to the second channels 116 although there is an emf to drive it. Thus this inferior need to be improved.

SUMMARY OF THE INVENTION

An object of the present invention is to improve this problem so as to improve the oxygen collecting efficiency.

The present invention disclosed an oxygen generator. it comprises a honeycomb body formed of an oxygen ion conductor having n column by m row channels formed therethrough, wherein among the channels located at the odd rows have a first porous conductive layer coated thereon walls of the first channels to serve as cathode electrodes and the even rows have a second porous conductive layer coated thereon walls of the second channel to serve as anode electrodes and the channels at the same row are electrically in parallel connected. M pairs of glass sealed members corresponding to m rows of channels to seal the outlets. Each pair of which is mount on two rectangular recesses at front and rear side faces of the channels in a row to seal the outlets of the channels. The cathode channels are interconnected via first through-holes, which are alternatively, formed at the front side face or at the rear side face of the channel adjacent wall and beneath rectangular recess or the glass sealed member in a way across the honeycomb body to constitute a tortuous path for air flow. The anode channels are interconnected via second through-holes, which are formed at both front side face and the rear side face of the channel adjacent wall and beneath rectangular recess. M/2 number of inlets of air drilled through a first outmost sidewall of the honeycomb body to intersect with the first column of said channels of said cathode electrodes, respectively. m/2 number of outlets of exhaust air drilled through a second outmost sidewall of said honeycomb body to intersect with the first column of said channels of said cathode electrodes, respectively, wherein said first outmost sidewall are opposite to said second outmost sidewall; and m/2 $O_2$ outlets for oxygen collection drilled through said first outmost sidewall of said honeycomb body to connected the first column of said channels of said anode electrodes, respectively.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Reference will now be made in detail to exemplary embodiments, which are illustrated in the accompanying drawings, wherever possible, the same reference numbers will be used throughout the drawings to refer to the same or similar parts.

Figure 1:
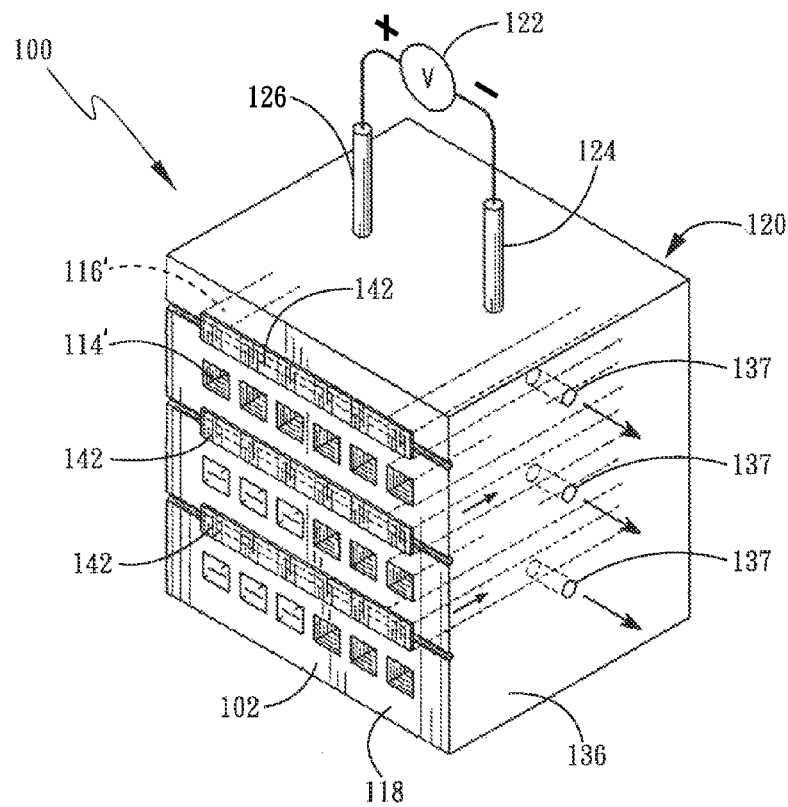
FIG. 1 illustrates a conventional oxygen generator.
Figure 2:
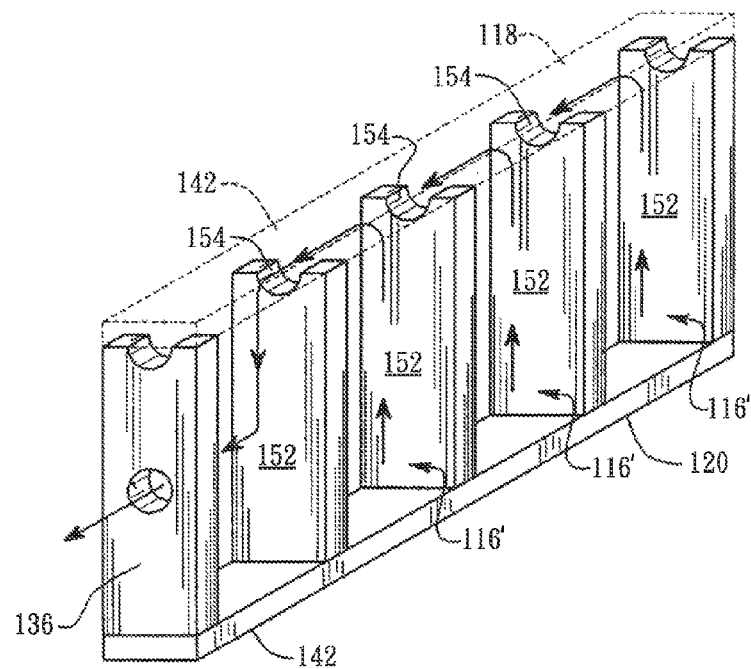
FIG. 2 illustrates an exploded perspective diagram of the oxygen generator according to prior art.
Figure 3:
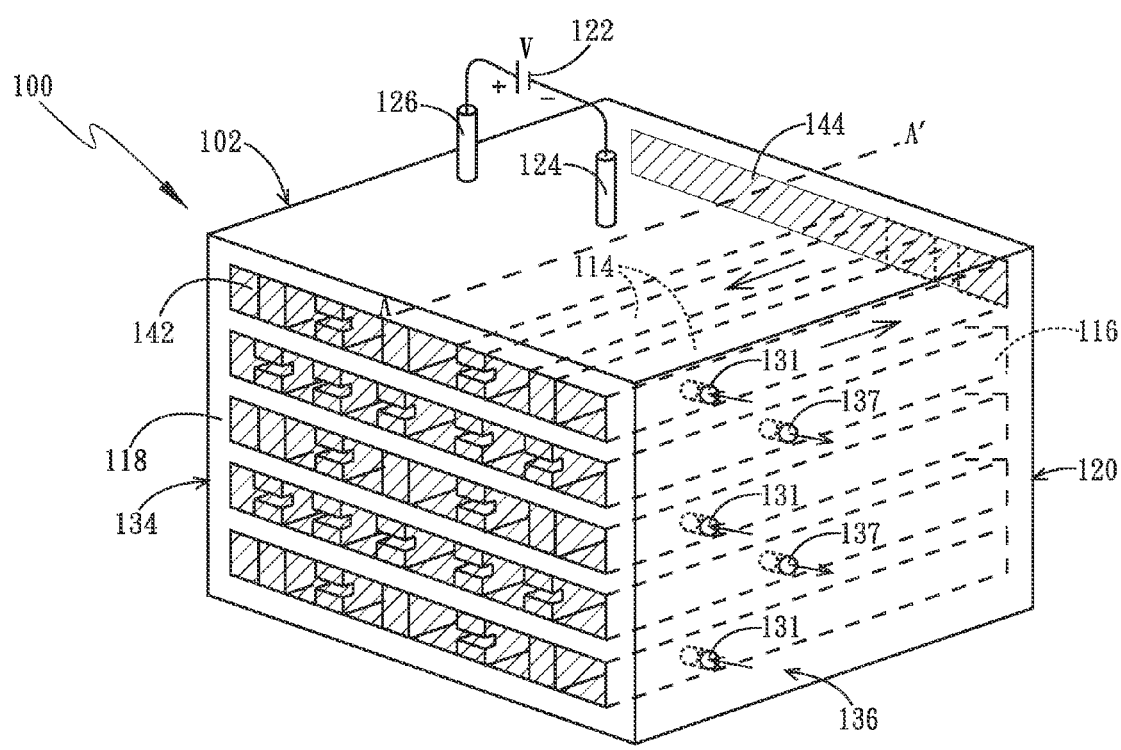
FIG. 3 illustrates a perspective diagram of an oxygen generator according to the present invention.

Referring to FIG. 3, a perspective appearance diagram of an oxygen generator 100 in accordance with a first preferred embodiment of the present invention is shown. The oxygen generator 100 includes a honeycomb structure 102, with at least one air flow channel and an oxygen flow channel. As shown in FIG. 3, a plurality of the air flow channels or called first channels 114 and the oxygen flow channels or called second channels 116 are formed from a front face 118 through the body 102 to a rear face 120, respectively. The body 102 is made of the oxygen ion conductive material such as a bismuth oxide ($Bi_2O_3$) doubly stabilized with $Y_2O_3$ and $ZrO_2$.

According to a preferred embodiment, a plurality of first channels 114 and the second channel 116 are interlaced in row and arranged as n columns×m rows. The odd rows are the first (air flow) channels 114 and even rows are the second (oxygen flow) channels 116. Every row at the front face 118 is sealed by using a sealed member 142 such as a glass sealed slat and the rear face 120 are sealed by the same 144 so that all of the inlets and outlets of the first and second channels 114, 116 are closed. Preferably, the two outmost rows of the honeycomb structure are always served as first channel 114 so that every row of the second channel 116 is sandwiched by two rows of the first channels 114, as shown in FIG. 3. This arrangement has found to get more efficiency on oxygen collections.

To, form the electrodes, all of the walls of the first channels and the second channels 114, 116 are formed with a first porous conductive layer, and a second porous conductive layer thereon, respectively. To electrically connect the channels in each row, an electrical conductive screen 113 may attach on the sealed member 142, 144 or mounted on the front side face and the rear side face of the walls. In an embodiment, the electrical conductive layer 113 is an Ag screen so that the first channels 114 at the same row are electrically in parallel connected. Similarly, the second channels 116 at the same row are in parallel connected.

The first and the second porous conductive layers 1141, 1161 are formed by a dip-coating method. In the method, slurry having gold power mixed therein is coated on the walls of the first channels 114 and the second channels 116. The slurry is provided as a catalytic for transformation between oxygen molecules and oxygen ions to prompt efficiency. In another embodiment, a Ag/Pd paste is further pasted on the slurry of the second channels 116 and a Ag paste is pasted on the slurry of the first channel 114. The slurry and paste are both porous after drying.

A power source 122 with its negative terminal 124 and positive terminal 126 are connected, respectively, to the first channels 114 and second channels 116 of the honeycomb oxygen generator 100 to provide a driving force for prompting oxygen ions diffusing from the first channels to the second channels.

Figure 4A:
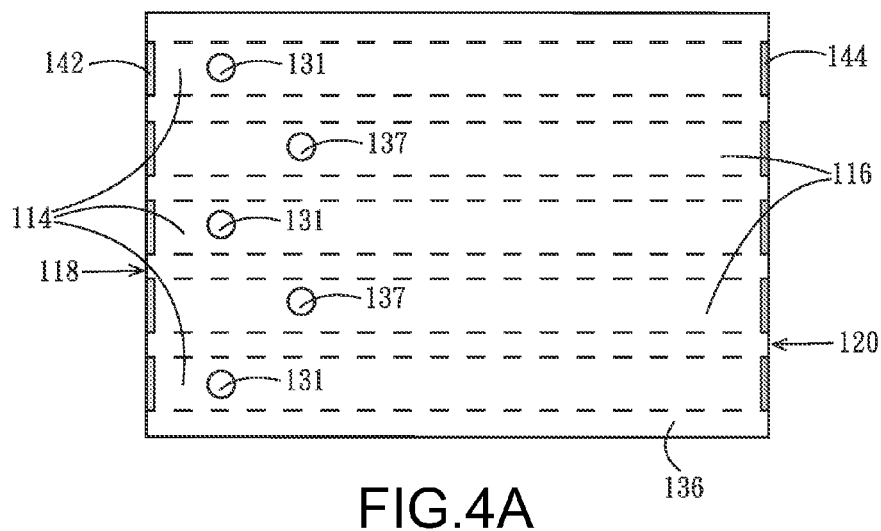
FIG. 4A and FIG. 4B illustrates, respectively, a right-side view and a left-side view diagram.

Referring to FIG. 4A, a right side view of the oxygen generator 100 illustrating air inlets 131 drilled through the right face 136 along a direction perpendicular to the long axis of the first channels 114. Each inlet 131 is connected to a first channel 114 of the first column nearest to the right face 136.

Still referring to FIG. 4A, two outlets of oxygen arranged as a column are drilled through the right face 136 of the honeycomb body 102 to connect to the second channels, which are along a direction perpendicular to the long axis of the second channels 116.

Figure 4B:
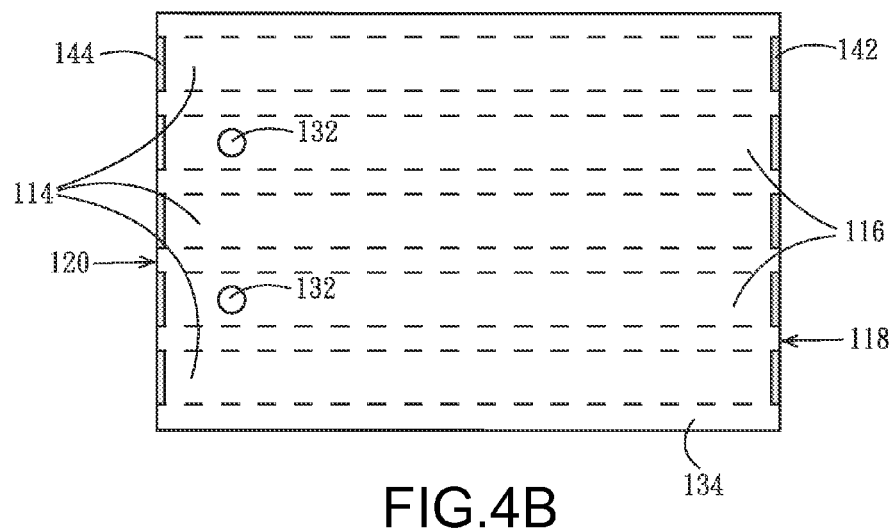

Referring to FIG. 4B, a left side view of the oxygen generator 100 illustrating two outlets 132 of exhaust air arranged as a column are drilled through the left face 134 along a direction perpendicular to the long axis and connected thereto the first channels 114.

The positions of forgoing inlets of air 131, $O_2$ outlets 137, and outlets of exhaust air 132 are just exemplary and not intended to limit the claimed scope. For instance their positions may all locate at the same side 136 or partially at the opposite side. However, the air inlets 131 and $O_2$ outlets 137 are preferably at the same side to acquire better oxygen collection efficiency.

Figure 5:
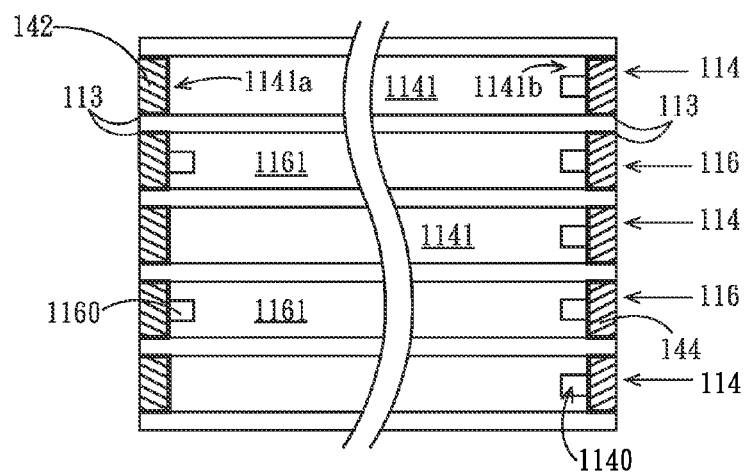
FIG. 5 illustrates a cross-sectional view cut along a line A-A' of FIG. 3.

Referring to FIG. 5, it shows a cross-sectional view cut along a line A-A' of FIG. 3. Two rectangular recesses 1141a, 1141b are formed at the front end and the rear end of each channel wall 1141 by milling the honeycomb body 102 row by row for housing the sealed members 142, 144, respectively. The first channels are further interconnected via through-holes 1140, which are further formed beneath the rectangular recesses 1141a at a front side face 1141a of one column and beneath the rectangular recesses 1141b at a rear side face 1141b of the adjacent column. Please refer to FIG. 6A, a local perspective diagram of FIG. 3 shown one row of the first channels 114 too.

Figure 6A:
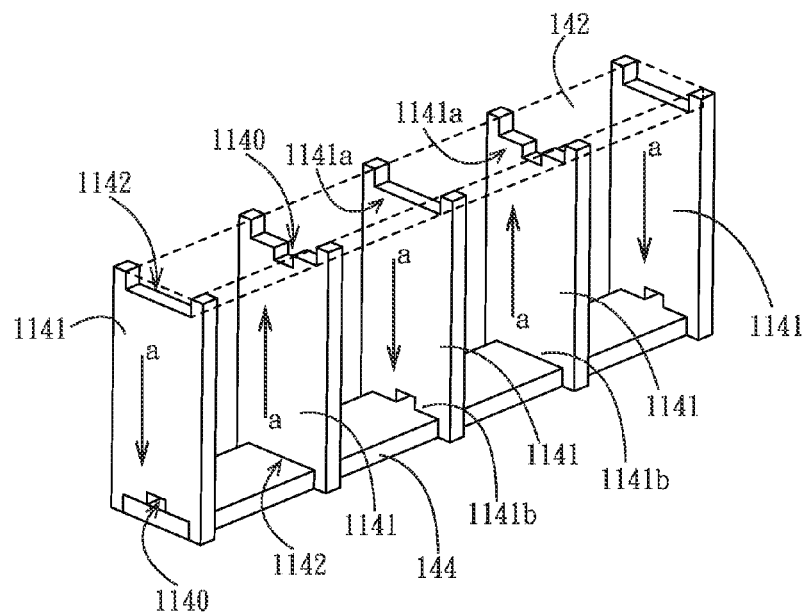
FIG. 6A illustrates an air passage of the oxygen generator according to a first preferred embodiment of the present invention.

In a preferred embodiment, the positions of the through-holes 1140, are in turn changed between the first end (front side face) 1141a and the second end (rear side face) 1141b all the way across the honeycomb body 102 so as to create a tortuous air flow path, shown as arrow direction in FIG. 6A thereby increasing the time of air staying so that the chances of the oxygen ions tunneling the oxygen ion conductor are increase. The through-holes 1140 may be notches, rectangular cuts, or semi-circles.

Turning back to FIG. 5, the both ends of the second channel walls 1161 are also formed with two rectangular recesses 1142 respectively by milling the honeycomb body 102 row by row for housing the sealed members 142, 144. The through-holes 1160 are formed at the both ends of the channel walls 1161 beneath the rectangular recesses 1142 for manufacture convenience and for interconnecting the second channels 116. The through-holes 1160 are adjacent and beneath the rectangular recesses 1142.

After forming the conductive layers, the Ag screen, the glass sealed members 142, 144 having a size matches the rectangular recesses 1142 are then mounted thereon. The through-holes 1140 beneath the glass slats 142, 144 are served as the air passage. Thereafter, a heating step is carried out and held the temperature between about 700~760° C. for 40 to 60 minutes to soft the glass sealed members 142, 144 for ensuring the outlets of the channels 114, 116 are completely sealed.

Figure 6B:
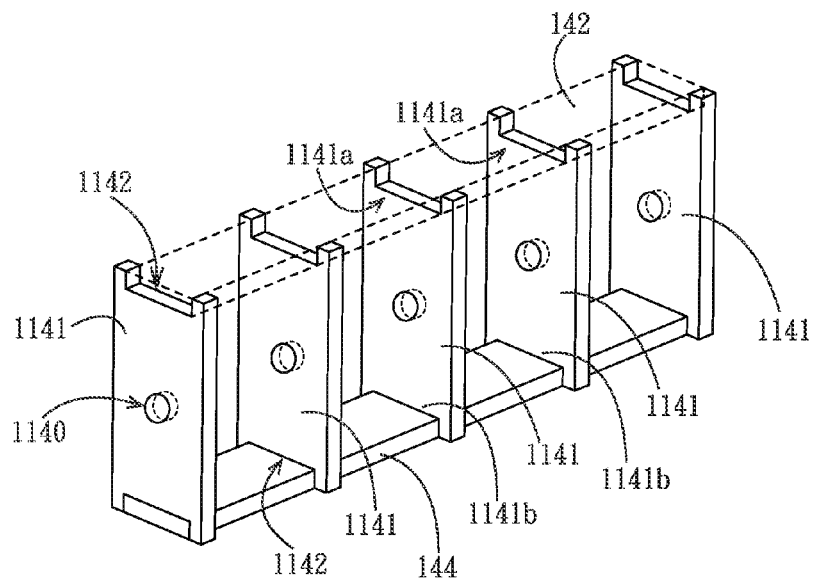
FIG. 6B illustrates an air passage of the oxygen generator according to a second preferred embodiment of the present invention.

In another embodiment the through-holes 1140 aren't formed at the ends but at a mid section of the sidewall, as shown in FIG. 6B.

In the oxygen generator according to prior art, the air path from the entry to the outlet is straight in comparison with the tortuous flow path of the present invention. Hence the oxygen collection efficiency of the oxygen generator according to the present invention is prompted significantly.

Figure 7:
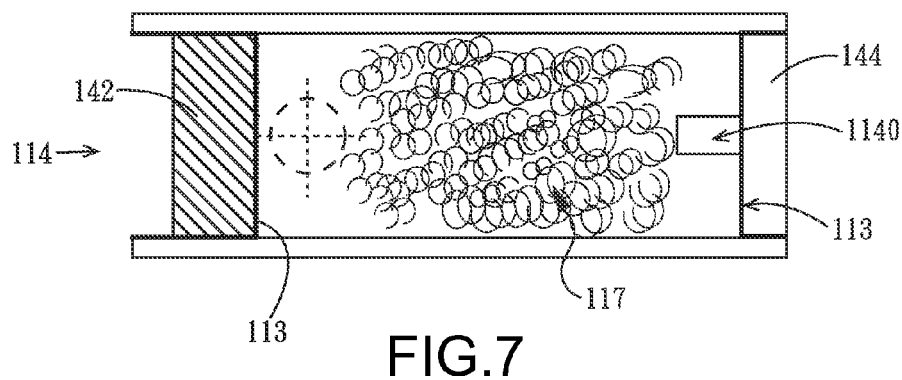
FIG. 7 illustrates a cross-sectional view of the oxygen generator showing a first passage having according to the present invention.

Furthermore, some of the silver silk wool 117 may disposed in the first channels 114 to create turbulence flows to further increase the possibility of the oxygen ions diffused through the solid ion conductor, as is shown in FIG. 7.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. An oxygen generator comprising:
    a honeycomb body formed of an oxygen ion conductor having a plurality of columns by a plurality of rows of channels formed from a front face therethrough to a rear face of said honeycomb body, wherein the channels located at the rows with odd ordinal numbers have a first porous conductive layer coated thereon channel walls to serve as cathode channels and the channels located at the rows with even ordinal numbers have a second porous conductive layer coated thereon walls to serve as anode channels and said channels at the same row are electrically in parallel connected;
    a plurality of sealed members sealed all the rows of said cathode channels and said anode channels, wherein each row of said channels is sealed by the two sealed members, respectively, at the front face and the rear face of said honeycomb body;
    a plurality of first through-holes formed through said channel walls between said cathode channels so that said cathode channels at different columns but the same rows are mutual interconnected;
    a plurality of second through-holes formed through channel walls between said anode channels so that said anode channels are mutual interconnected at different columns but the same rows;
    a plurality of air inlets each corresponding one of said rows of said cathode channels formed through a first lateral face of said honeycomb body to connect with said cathode channels;
    a plurality of exhaust air outlets, each corresponding one of said rows of said cathode channels through a second lateral face of said honeycomb body to connect with said cathode channels; and
    a plurality of $O_2$ outlets each for one of said rows of said anode channels for oxygen collection formed through said first outmost sidewall of said honeycomb body to connected said anode channels.

2. The oxygen generator according to claim 1 wherein said oxygen ion conductor is formed of $Bi_xO_y$ doubly stabilized with $Y_2O_3$ and $ZrO_2$.

3. The oxygen generator according to claim 1 wherein said first porous conductive layer is formed of a gold slurry layer having silver paste formed thereover after drying and said second porous conductive layer is formed of a gold slurry layer having a paste mixed with Pd and Ag formed thereover, after drying.

4. The oxygen generator according to claim 1 wherein said channels at the same row are electrically in parallel connected by Ag screens pasted on both said front and rear face of the walls, respectively or pasted on said sealed members.

5. The oxygen generator according to claim 1 further comprises a plurality of rectangular-recess rows, each along said rows of channels constructed by rectangular recesses through channel walls of longitudinal ends of said channels at the front and at the rear face for seating said sealed members.

6. The oxygen generator according to claim 5 wherein said first through-holes are formed at a position beneath said rectangular recesses of said cathode channels.

7. The oxygen generator according to claim 6 wherein said first through-holes having odd ordinal numbers thereof are joined said rectangular recesses at the front face, respectively, and said first though holes having even ordinal numbers are joined said rectangular recesses at the rear face, respectively and said ordinal numbers are counted at the same rows.

8. The oxygen generator according to claim 1 wherein the number of the rows of said cathode channels is larger than that of said rows of said anode channels.

9. The oxygen generator according to claim 1 wherein said first through-holes are aligned and formed at mid section of all cathode channel-adjacent walls.

10. The oxygen generator according to claim 1 further comprises silver wools disposed in said cathode channels.

11. The oxygen generator according to claim 1 wherein said second through-holes are formed at both ends of channels beneath said rectangular recesses.

12. A method of forming an oxygen generator, comprising the steps of:
    providing a honeycomb body having a plurality of columns by a plurality of rows of channels formed therethrough;
    forming rectangular recesses at front longitudinal ends and at rear longitudinal ends of channel walls along every row so that there are a plurality of front-recess rows constructed at a front face and a plurality rear-recess rows constructed at a rear face of said honeycomb body;
    forming first through holes at said channel walls between said channels of said rows having odd ordinal numbers, said first through holes either joined said rectangular recesses of said front-recess rows or said rear-recess rows; so that the channels at different columns but the same row are mutual interconnected;
    forming second through holes at said channel walls between said channels joined said rectangular recesses of said rows having even ordinal numbers so that said channels at different columns but the same row are interconnected by said second through holes;
    forming a first conducting porous layer on said channel walls of said channels of rows with odd ordinal numbers as cathode channels, and a second conducting porous layer on said channel walls of said channels of said rows with even ordinal numbers as anode channels;
    providing a plurality of glass seal members;
    mounting conducting screens on said glass seal members or on both said front and said rear face of the walls to make said anode channels in parallel connected and said cathode channels in parallel connected;
    sealing said front-recess rows and said rear-recess rows, each with one of said sealing members;
    forming a plurality of air inlets by drilling through a first lateral face of said honeycomb body, each of said air inlets interconnected with one of said rows of said cathode channels;
    forming a plurality of air outlets by drilling through a second lateral face of said honeycomb body, each of said air outlets interconnected with one of said rows of said cathode channels;
    forming a plurality of outlets of oxygen collection by drilling through said first lateral face of said honeycomb body, each of said outlets of oxygen collection interconnected with one of said rows of said anode channels.

13. The method of forming an oxygen generator according to claim 12 wherein said steps of sealing further comprising heating said honeycomb body at a temperature between about 700~780° C. for 40 to 60 minutes so that said channels are completely sealed by said glass sealed members.

\* \* \* \* \*